United States Patent [19]

Rickert

[11] 3,784,760

[45] Jan. 8, 1974

[54] TELEPHONE SET ILLUMINATION CIRCUIT

[75] Inventor: Richard Michael Rickert, Indianapolis, Ind.

[73] Assignee: Bell Telephone Laboratories, Incorporated, Murray Hill, N.J.

[22] Filed: May 15, 1972

[21] Appl. No.: 253,501

[52] U.S. Cl. ................................ 179/90 L, 240/2.1

[51] Int. Cl. ............................................ H04m 1/22

[58] Field of Search.............. 179/90 L, 81 C, 84 L, 179/26 FC, 90 AN, 27 FC; 58/50 R; 240/2.1

[56] References Cited

UNITED STATES PATENTS

| | | | |
|---|---|---|---|
| 3,412,213 | 11/1968 | McCay | 179/81 C |
| 1,914,124 | 6/1933 | Harper | 179/90 L |
| 2,884,491 | 4/1959 | Breen | 179/81 C |
| 3,374,317 | 3/1968 | Chapin | 179/81 C |
| 3,714,867 | 2/1973 | Dargent | 58/50 |

*Primary Examiner*—Kathleen H. Claffy
*Assistant Examiner*—G. B. Brigance

[57] ABSTRACT

Illumination for the dial of a telephone set is provided by one or more light-emitting diodes powered from a local battery. Battery power is maintained at an operative level by applying a constant trickle charge from the line. To conserve the battery, the light source is energized only when the set goes off-hook – and then, only for a timed interval.

10 Claims, 2 Drawing Figures

PATENTED JAN 8 1974 3,784,760

TELEPHONE SET ILLUMINATION CIRCUIT

BACKGROUND OF THE INVENTION

1. Field of the Invention

This invention relates to the illumination of telephone sets and more particularly to arrangements that provide dial illumination.

2. Description of the Prior Art

A variety of means are known in the prior art that furnish illumination, including dial illumination, for telephone sets. One typical arrangement employs a conventional tungsten filament incandescent lamp mounted inside the telephone base under the dial with commercial a.c. power fed through a low voltage, current limiting transformer. A lighting scheme of this general type is shown, for example, by H. J. Hershey, H. G. Jordan and W. E. Restall, Jr., in U. S. Pat. No. 2,988,631 issued June 13, 1961.

Although telephone dial illumination is a highly convenient feature that is becoming increasingly popular with telephone users, there are also attendant disadvantages. For example, incandesent lamps burn out periodically, requiring replacement; and the requirement for a plug-in to commercial power, coupled with the necessity for a transformer, is both a nuisance and an added expense. The general object of the invention is to avoid the disadvantages indicated.

SUMMARY OF THE INVENTION

The stated object and additional related objects are achieved in accordance with the principles of the invention by a telephone illuminating arrangement employing one or more light-emitting diodes (LED's) as the illumination source. To ensure an adequate power source for the LED, a local battery is used which is connected to receive a steady trickle charge from the central office d.c. power that is applied to the line.

An important feature of the invention is that energization of the light source by way of the local battery occurs only in response to the telephone set being placed in the off-hook condition.

Another important feature of the invention is the use of a timing circuit to ensure that power is supplied to the light source for only a limited preselected time interval, long enough to permit the subscriber to complete dialing, for example, after it is turned on in response to an off-hook switching operation.

DETAILED DESCRIPTION

Figure 1:
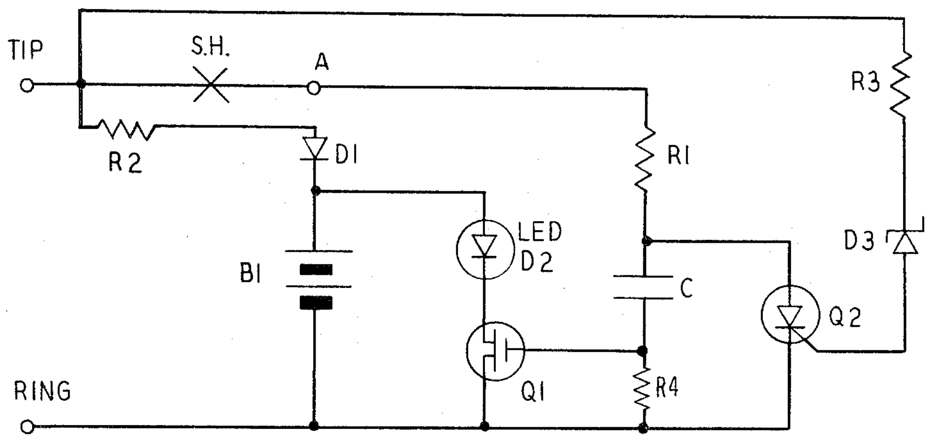
FIG. 1 is a schematic circuit diagram of a lighting arrangement in accordance with the invention.

The circuit of FIG. 1 is designed for positioning within a telephone set, either the handset or the base, with the light-emitting diode D2 preferably located to effect illumination of the dial. In dial-in-handset models, the entire circuit including diode D2 would preferably be mounted within the handset.

In principle, an LED such as the diode D2 could be connected in a telephone set without recourse to the expense of the rest of the circuitry shown in FIG.. 1 and without a source of stored energy as is provided by the battery B1. Practical limitations on power available from a long telephone loop, however, make it unlikely that sufficient luminous energy could be obtained in all circumstances from commercially available LED's. In accordance with the invention, battery B1 is provided, therefore, to circumvent this practical limitation on the availability of power under present day telephone practices. The use of local stored energy for lighting power with nothing more raises one possible disadvantage in that an unduly long period of off-hook operation for the telephone could discharge the stored energy source and render the dial unlit for an immediately subsequent dialing operation. This situation is avoided, in accordance with the invention, by providing only a short timed interval of dial illumination after each off-hook operation of the set. Resistors R1, R4 and capacitor C provide gate drive for transistor (IGFET) Q1 whenever the voltage at point A swings positive as it would when the set goes off-hook. After a period of time, capacitor C charges to a voltage sufficiently near the off-hook tip voltage to deprive transistor Q1 of gate drive. The light source D2 remains lighted for this period only. Once the call is completed and an off-hook to on-hook transition occurs, capacitor C must be discharged quickly in order to allow for the situation when calls are made in quick succession. The thyristor Q2 is employed to provide the required rapid discharge path for capacitor C. Thyristor Q2 is turned on by the tip voltage at the set rising to near central office battery potential when the current drain of the set disappears. A zener diode D3 prevents thyristor Q2 from being triggered in an off-hook set. A resistor R3 merely limits the current in diode D3 and in the gate circuit of thyristor Q2 to the small value needed for triggering that device. A resistor R2 provides slight leakage around the switchhook SH to trickle charge the battery B1. A diode D1, connected between resistor R2 and the battery B1, protects the battery B1 from damage which may be caused by a reverse line voltage and from discharge which may be caused by a low line voltage during speech transmission.

Figure 2:
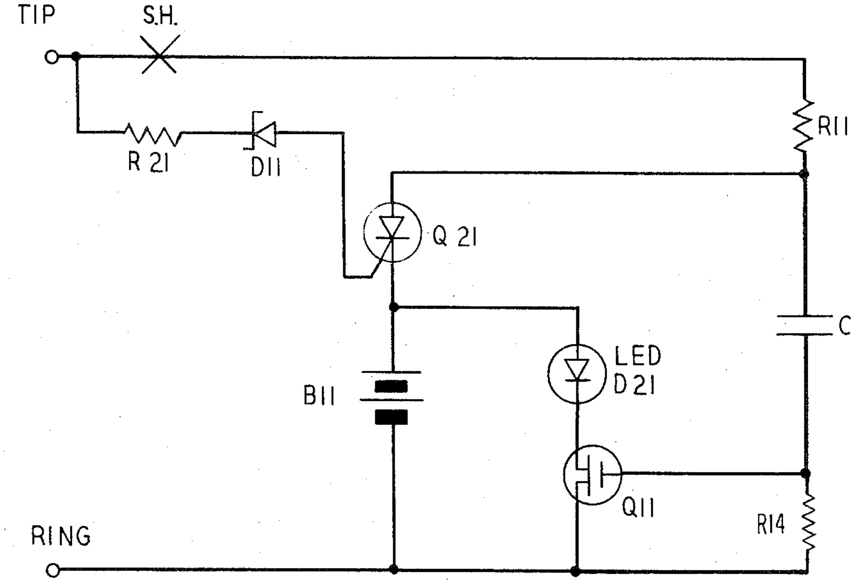
FIG. 2 is a variant of the arrangement shown in FIG. 1.

In the modified circuit shown in FIG. 2 the trigger path for thyristor Q21 and the trickle charge path for battery B11 have been combined in order to achieve a slight economic benefit. This configuration, however, imposes somewhat of a constraint on the reverse voltage rating of the gate cathode junction of thyristor Q21 and shortens the timing cycle slightly for a given value of resistor R11 and capacitor C, as compared to the circuit of FIG. 1, owing to the fact that capacitor C is not discharge as fully by thyristor Q21.

It is to be understood that the embodiment described herein is merely illustrative of the principles of the invention. Various modifications thereto may be effected by persons skilled in the art without departing from the spirit and scope of the invention.

I claim:

1. Apparatus for illuminating a telephone set comprising, in combination:

a source of illumination;

a local battery for providing power to said source of illumination;

means responsive to a transition from an on-hook to an off-hook mode in said set for applying said battery to said source;

means for applying a trickle charge to said battery from a telephone line connected to a source of d.c. power; and means including a timing circuit for limiting the duration of operation of said battery applying means.

2. Apparatus in accordance with claim 1 wherein said source of illumination comprises at least one light-emitting diode.

3. Apparatus in accordance with claim 2 wherein said trickle charge applying means comprises tip and ring terminals connectable to a telephone line, means connecting said terminals by way of a series combination of a resistor, and a dual function circuit element for preventing a reverse voltage from damaging said local battery and for preventing a low line voltage during speech transmission from discharging said local battery.

4. Apparatus in accordance with claim 3 wherein said dual function circuit element comprises a diode.

5. Apparatus in accordance with claim 4 including means connecting one terminal of said light-emitting diode to a terminal common to said dual function diode and said battery and means including the drain-source path of a transistor connecting the other terminal of said light-emitting diode to said ring terminal, said timing circuit comprising the series combination of a resistive and a capacitive element connected between said tip lead and the gate electrode of said transistor.

6. Apparatus in accordance with claim 5 including means for rapidly discharging said capacitive element thereby ensuring readiness for an immediately following illumination cycle.

7. Apparatus in accordance with claim 6 wherein said discharging means comprises a thyristor connected between a junction common to said resistive and capacitive elements of said timing circuit and said ring terminal, and means connecting the gate electrode of said thyristor to said tip terminal thereby to prevent said thyristor from being triggered in an off-hook set and for limiting the current flow through said thyristor.

8. Apparatus in accordance with claim 7 wherein said gate electrode connecting means comprises the series combination of a resistive element and a diode.

9. Apparatus for illuminating a telephone set comprising, in combination:

an electrical circuit having tip and ring terminals connectable to the corresponding terminals of a telephone line having d.c. voltage applied thereto from a central office;

said circuit including a local battery;

a source of illumination;

means responsive to a transition from an on-hook to an off-hook mode by said set for applying energizing current from said battery to said source;

means for limiting the operation of said battery applying means to a period of time sufficient to enable the illumination of said set during dialing; and means for applying a trickle charging current from said line to said battery.

10. Apparatus in accordance with claim 9 wherein said limiting means includes a capacitor which determines the period of time during which the illuminating source is energized, and means for rapidly discharging said capacitor thereby to permit the initiation of illuminating cycles in rapid succession.

* * * * *